US006332531B1

United States Patent
Damkjaer

(10) Patent No.: US 6,332,531 B1
(45) Date of Patent: Dec. 25, 2001

(54) MODULAR UNIT FOR THE FABRICATION OF CONVEYORS

(75) Inventor: Poul Erik Damkjaer, Vejle (DK)

(73) Assignee: Uni-chains A/S, Vejle (DK)

( * ) Notice: Subject to any disclaimer, the term of this patent is extended or adjusted under 35 U.S.C. 154(b) by 0 days.

(21) Appl. No.: 09/549,709

(22) Filed: Apr. 14, 2000

(30) Foreign Application Priority Data

Mar. 20, 2000 (DK) .............................................. 2000-00460

(51) Int. Cl.⁷ .................................................. B65G 15/42
(52) U.S. Cl. .......................................................... 198/690.2
(58) Field of Search ................................ 198/690.2, 698, 198/699

(56) References Cited

U.S. PATENT DOCUMENTS

| 4,832,183 | * | 5/1989 | Lapeyre | ............................. | 198/690.2 |
| 5,165,514 | * | 11/1992 | Faulkner | ............................. | 198/690.2 |
| 5,413,211 | * | 5/1995 | Faulkner | ............................. | 198/690.2 |

* cited by examiner

Primary Examiner—Joseph E. Valenza
(74) Attorney, Agent, or Firm—Antonelli, Terry, Stout & Kraus, LLP

(57) ABSTRACT

A first modular unit (1) for the fabrication of conveyors (2), said first modular unit (1) comprising an upper surface (3) and a lower surface (4) and means (5) along at least one, preferably two long sides (13) lying diametrically opposite each other, for pivotal hinging of the first modular unit (1) to a second modular unit (6), and where extending from the upper surface (3) said first modular unit (1) comprises a flat carrier (7) with a front surface (8) and a rear surface (9), an upper concluding end (10) and two side edges (11) lying opposite each other, the middle/center plane (12) of said carrier (7) standing substantially at right angles to the upper surface (3) and extending parallel with the long sides (13). The front surface (8) and the rear surface (9) of the carrier each comprise at least one pin (14) extending from the side edges, a first surface (15) of said pins (14) facing towards the surface from which they extend and being flat parallel with this surface, and where the distance of the first surface (15) of the pins (14) to the middle/center plane (12) of the carrier (7) is at a maximum twice the distance between the middle/center plane of the carrier and the surface from which the pin (14) extends. The carriers lock tightly against each other, so that these withstand even great and uneven loads in such a manner that in certain areas greater weight and lesser weight can be applied to the carriers without this causing the carriers to separate from each other, and thus give rise to the possibility for the material which is to be conveyed to escape between possible cracks.

16 Claims, 3 Drawing Sheets

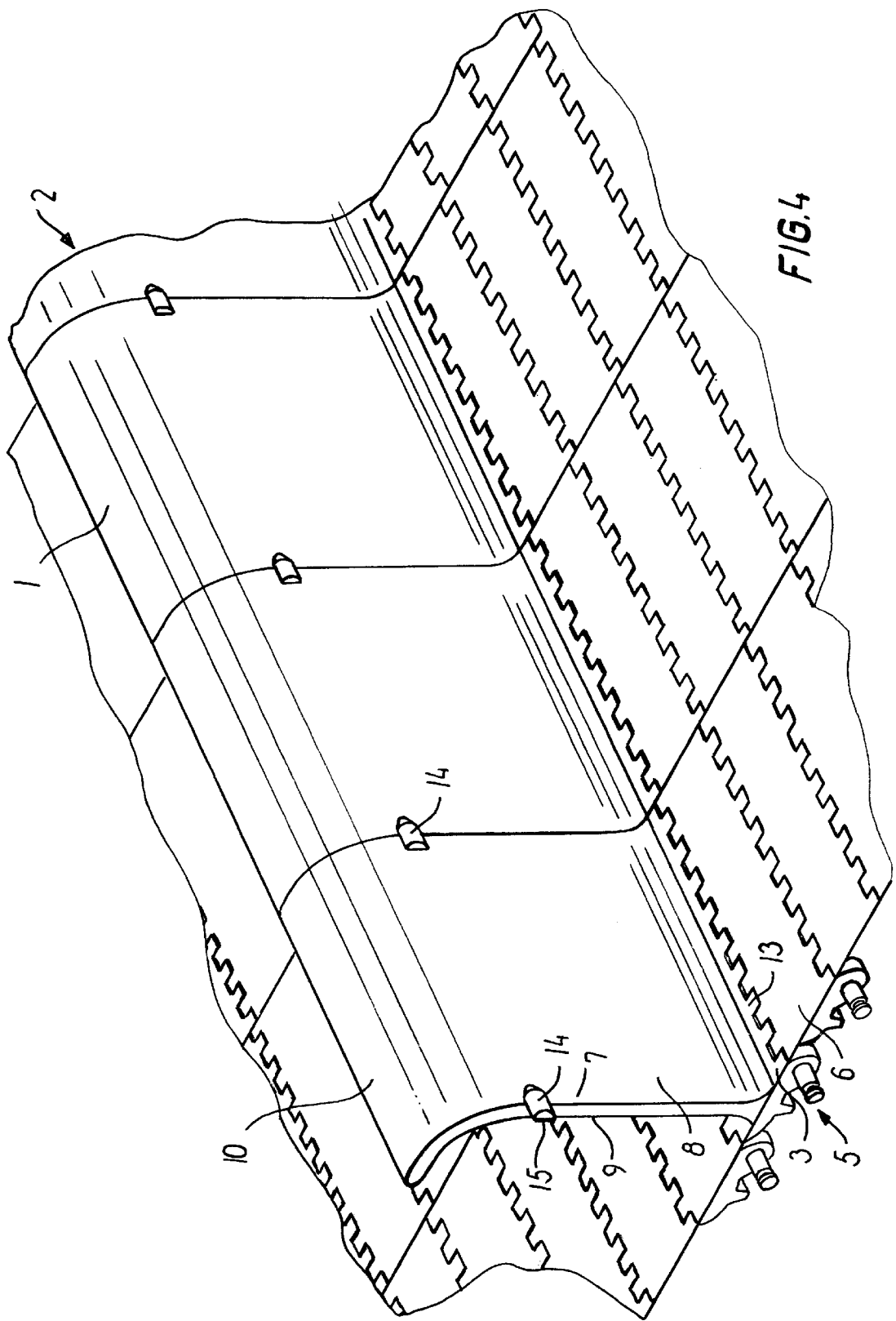

MODULAR UNIT FOR THE FABRICATION OF CONVEYORS

BACKGROUND OF THE INVENTION

1. Field of the Invention

The invention concerns a first modular unit for the fabrication of conveyors, said first modular unit comprising an upper surface and a lower surface and means along at least one, preferably two long sides lying diametrically opposite each other, for pivotal hinging of the first modular unit to a second modular unit, and where extending from the upper surface said first modular unit comprises a list carrier with a front surface and a rear surface, an upper concluding end and two side edges lying opposite each other, the middle/center plane of said carrier standing substantially at right-angles to the upper surface and extending parallel with the long sides.

The invention also concerns a conveyor for the transport of items which makes use of the modular unit described above.

2. Description of the Prior Art.

From U.S. Pat. No. 5,165,514 there is known a modular unit which is used for conveyors where these conveyors are of a rising character, i.e. they are required to transport materials at an angle in relation to the horizontal. These materials can be, for example, flour, coffee and similar materials or materials which are of a more coarsely grained size.

The conveyor is fabricated with modular units which are arranged at the side of one another in the formation of the conveyor breadths and where the front and rear of the modular units are pivotally connected to a similar row, whereby the conveyor is formed. On the modular units there are carriers, i.e. substantially right-angled plate pieces, which ensure that the material to be conveyed and at an angle in relation to the horizontal does not slide off the belt, but is caught by these carriers. During this process the problem arises that the weight of the material can result in the carriers not remaining tight between the links, so that they do not stand correctly in relation to one another. Especially with fine materials such as flour and sugar, the sugar and the flour will thus run away between the carriers.

In the above-mentioned U.S. patent, an attempt to solve this problem is made by providing a groove in the one concluding edge of the carrier and a corresponding tongue in the other, which thus enter into engagement with each other in a form of tongue-and-groove construction. However, this gives rise to areas where accumulations of bacteria can take place, and where as a result of the intricate configuration it can be difficult for these bacteria accumulations to be removed again, and consequently the solution is not considered to be hygienic.

Alternatively, the surfaces on the carriers, which abut up against each other, can extend in an inclined manner so that a tightening effect should arise. However, also in the areas where these abut up against each other there arises a pronounced groove effect, which also gives rise to the collection of dirt, and moreover where the inclined course will probably result in a tight abutment as far as that surface which is the supported surface is concerned, but where that surface which is the supporting surface will have greater risk of separation in those cases where the carrier is exposed to a heavy load.

SUMMARY OF THE INVENTION

The present invention provides a modular unit whereby it is ensured that the carriers lock tightly against each other, so that these withstand even great and uneven loads in such a manner that greater or lesser weight can be applied to certain areas of the carriers, without this resulting in the carriers opening up in relation to one another, and thus give rise to the possibility for the material being conveyed to escape between possible cracks. Similarly, with this construction it is avoided that inexpedient corners and channels arise, and this is achieved with a modular unit and also where the front and rear surfaces of the carriers each comprise at least one pin extending outwards from the side ends, the first surface of said pins facing towards and being flat parallel with that surface from which they extend, and where the distance of the first surface of the pins to the middle/center plane of the carrier is at a maximum twice the distance between the middle/center plane of the carrier and the surface from which the pin extends.

The modular unit functions such that along the lines where hinges are provided, it is connected front and rear either with similar modular units or simply with modular units without carriers, and where laterally to a modular unit with a carrier further modular units with carriers are seen Because of the pin which sits on each individual carrier and substantially at the same height, and where that modular unit which has its pin provided on the front surface along a side edge will engage with a modular unit's carrier, where this carrier has a corresponding pin but merely placed on the rear surface. This second modular unit, with its pin placed on the front surface, will thus engage with a third modular unit, said third modular unit having a pin provided on its rear surface.

This arrangement is thus continued until the fabrication results in a conveyor with the desired breadth, and where as mentioned the pins ensure that the carriers enter into firm engagement with one another, and where there thus arises minimum risk of openings appearing between the carriers with the result that the material can escape through the cracks.

A modular unit is disclosed which achieves an optimum locking between the individual carriers.

A modular unit is disclosed which achieves a uniform production of the modular units.

A modular unit is disclosed which achieves an optimum stability of the carriers.

A modular unit is disclosed in which the pins themselves do not give rise to accumulations of bacteria.

A modular unit is disclosed in which no clearance arises between the carriers which are placed at the side of each other.

A modular unit is disclosed in which a further optimization of the mutual engagement between the carriers is achieved, whereby locking arises.

A modular unit is disclosed in which the carriers in themselves do not give rise to accumulations of bacteria.

The invention also concerns a conveyor.

BRIEF DESCRIPTION OF THE DRAWINGS

The invention will now be explained in more detail with reference to the drawing, where

FIG. 4 shows a conveyor comprising the first modular unit.

DESCRIPTION OF THE PREFERRED EMBODIMENTS OF THE INVENTION

Figure 1:
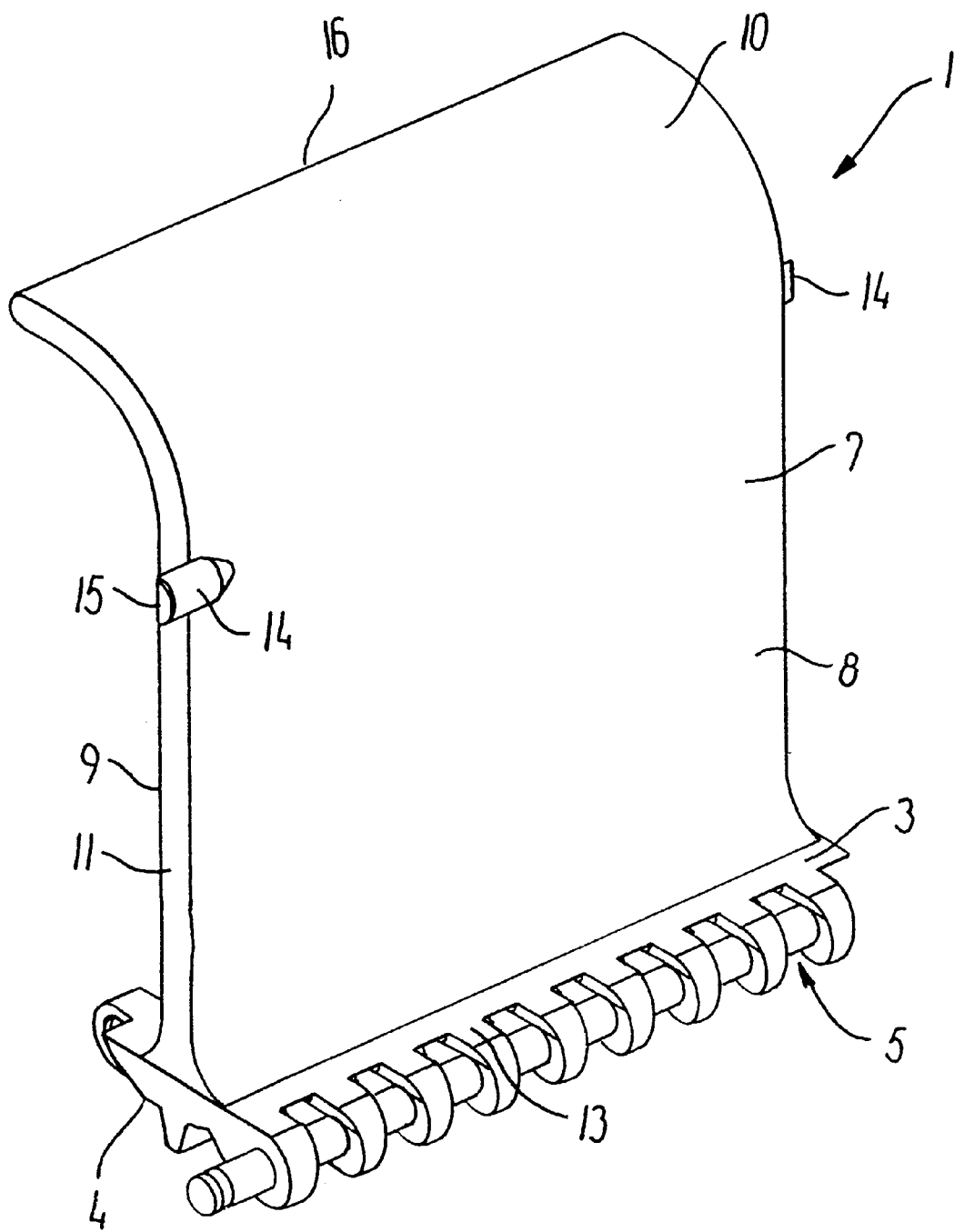
FIG. 1 shows a first modular unit according to the invention seen in perspective.

FIG. 1 shows a first modular unit 1 comprising a plate part having an upper surface 3 and a lower surface 4, said surfaces constituting the conveyor unit itself when these are assembled together with second modular units 6, such as seen in FIG. 4.

Via hinges 5 which comprise eyes and an axle which extend through the eyes, the first modular unit will be pivotally hinged to second modular units, such as seen in FIG. 4. Extending on the upper surface 3 of the first modular unit there is a carrier 7, the carrier 7 being flat in shape and having a center plane which stands at right-angles to the upper surface and parallel with the long sides 13 of the modular unit, the long sides 13 comprising the hinges as mentioned earlier.

The carrier 7 comprises a front surface 8 and a rear surface 9 which are flat and paralleled and where the upper end can either be curved as shown in FIG. 1 can be of such a character that the carriers appear rectangular. The upper including end 10 terminates in an end edge 16.

The carrier also comprises side edges 11. The side edges 11 are plane and thus without recesses or grooves or the like, so that areas for the accumulation of bacteria are avoided. On the front and rear surfaces of the carrier there are socaled pins 14 which are provided on the front and rear surfaces at the same vertical distance from the upper surface 3 of the modular unit, but such that providing that a pin is mounted on the front plate 8, the pin 14 on the rear surface 9 will extend out from the second side edge 11 of the modular unit and opposite the side edge 11 from which the pin 14 on the front surface 8 extends.

The pin is configured in such a way that it is mainly semicircular and comprises a plane surface designated the first surface 15, the plane surface facing in towards the center plane 12 of the carrier 7. This plane surface 15 has a distance to the center plane 12 which corresponds substantially to the distance of both the rear and front surfaces to this center plane. The surface can possibly lie at a slightly greater distance, though at a maximum corresponding to a half of the thickness of the carrier.

When these first modular units I are thus hooked into one another, in that the pin 14 on the front surface 8 on one modular unit has counter-stop abutment at the pin on a second modular unit, in that this pin 15 is provided on the rear surface 9 of the second modular unit, there is thus achieved a form of gripping effect originating from the pins 14.

In that the pins sit alternately on the front side and then on the rear side of a modular unit, it is achieved that there is no form of fork unit on the carrier which will give rise to an area to which accessibility is difficult for the removal of bacteria accumulations. It is important that the pins have a smooth and plane or convex surface so that accumulations of bacteria are avoided.

The pins are primarily moulded together with the carrier, and the carrier is either welded to or forms an integral part in the moulding of the rest of the first modular unit.

Figure 2:
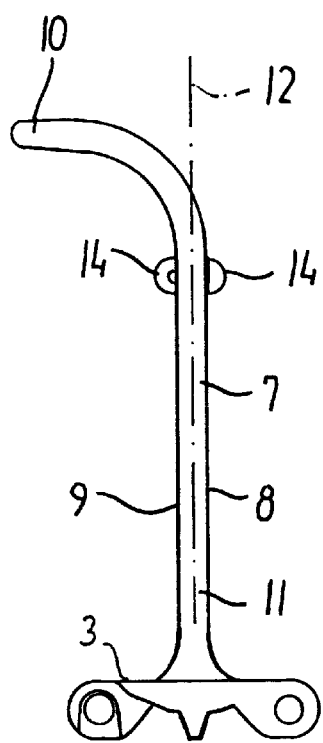
FIG. 2 shows the first modular unit shown in FIG. 1 seen from the side.

FIG. 2 shows a section through the modular unit shown in FIG. 1, and where the positioning of the pins 14 on both the front 8 and rear 9 surfaces is seen, and where it is seen that these lie at the same level above the upper surface 3. It should also be noted that the pins 14 are configured in such a way that the surface of the pin which extends out over the side edge 11 is substantially plane and parallel with the side edge, while in the area where it is joined to the front or rear surface it has a conical appearance, which makes it easier to clean. As mentioned, the distance from the first surface 15 of the pins 14 is substantially the same as the distance of both the front surface 8 and rear surface 9 to the center surface.

The distance between the upper surface 3 and the center axis of the pin 14 is greater than the distance between the center axis and the upper concluding edge 16.

Figure 3:
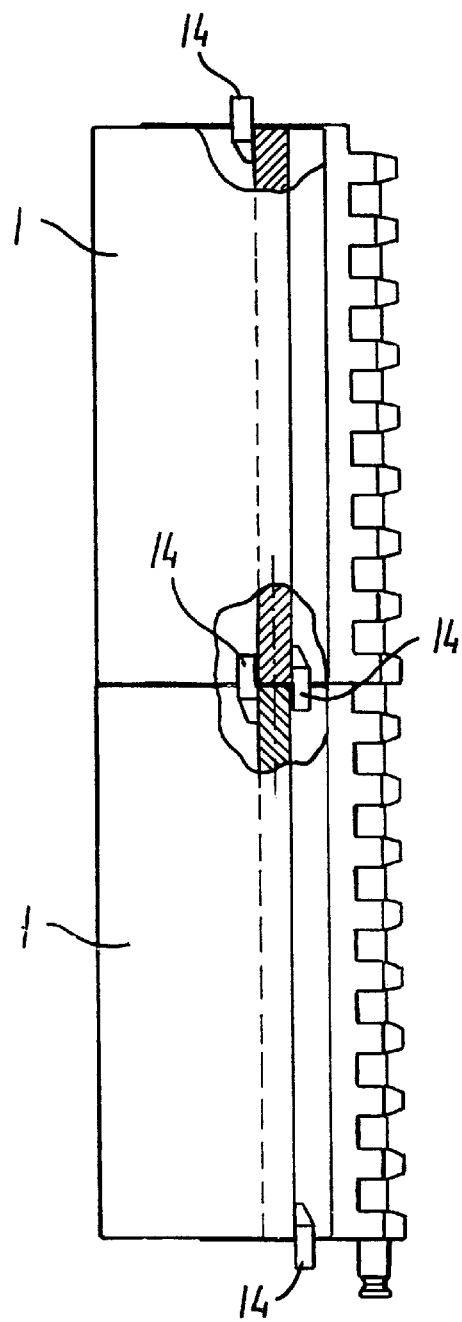
FIG. 3 shows a sectional view of the first modular unit shown in FIG. 1, seen from above and with a X-ray sections in the pin areas.

FIG. 3 shows the unit shown in FIG. 1 seen from above, and where a section has been taken in the area corresponding to the pins, where it is seen how these are positioned in relation to each other.

Finally, FIG. 4 shows a conveyor 2 on which the carrier according to the invention is mounted, the conveyor being particularly applicable for the vertical transport of materials due to the positioning of the carrier.

It is envisaged that the first modular units will be produced primarily in plastic material.

The invention is not limited solely to the present configuration, but can also be of other configurations in that the pins can have different shapes, but where the important aspect is that they are configured in such a way that there is no basis for bacterial accumulations, and in that it is important that it comprises elements on both the front and the rear surface of the carriers in such a manner that the carriers enter into firm gripping engagement with each other without risk of being forced apart during use and loading.

It should be noted that the concluding end 10 can also be configured in other ways, where here a curved form has been selected, but where this could well continue straight up, so that the carrier appears as a purely rectangular plate.

What is claimed is:

1. A first modular unit for the fabrication of conveyors, said first modular unit including an upper surface and a lower surface, two long sides and means along the two long sides, for pivotal hinging of the first modular unit to a second modular unit, and the first modular unit extending from the upper surface and comprising a flat carrier with a front surface and a rear surface, an upper end and two side edges lying opposite each other, a center plane of the carrier substantially at right-angles to the upper surface and extending parallel with the long sides, wherein the front surface and the rear surface of the carrier each comprise at least one pin extending from the two side edges, a first surface of the pins facing towards a surface from which the pins extend and is flat and parallel with the surface from which the pins extend and a distance of the first surface of the pins to the center plane of the carrier is at a maximum twice a distance between the center plane of the carrier and the surface from which the pins extend.

2. A first modular unit in accordance with claim 1 wherein:
   the distance from the first surface of the pins to the center plane of the carrier is substantially identical to or less than a distance between the center plane of the carrier and the surface from which the pins extend.

3. A first modular unit according to claim 1 wherein:
   the pins are disposed at a same vertical distance from an abutment of the carrier against the upper surface.

4. A first modular unit according to claim 1, wherein:
   a vertical distance between the upper surface and a center axis of the pins is greater than a distance between the center axis and an upper edge of the carrier.

5. A first modular unit according to claim 1, wherein:
a surface of the pins is smooth and is one of flat or convex.

6. A first modular unit according to claim 1, wherein:
a width of the carrier is the same as a width of the upper surface and the lower surface.

7. A first modular unit according to claim 1, wherein:
on the front surface the pins extend outwards from a side edge which is different from a side edge from which the pins on the rear surface outwardly extend.

8. A first modular unit according to claim 1, wherein:
the side edges of the carrier form a concluding surface which is plane or convex.

9. A conveyor for the transport of items, the conveyor comprising assembled first modular units in accordance with claim 1.

10. A conveyor for the transport of items, the conveyor comprising assembled first modular units in accordance with claim 2.

11. A conveyor for the transport of items, the conveyor comprising assembled first modular units in accordance with claim 3.

12. A conveyor for the transport of items, the conveyor comprising assembled first modular units in accordance with claim 4.

13. A conveyor for the transport of items, the conveyor comprising assembled first modular units in accordance with claim 5.

14. A conveyor for the transport of items, the conveyor comprising assembled first modular units in accordance with claim 6.

15. A conveyor for the transport of items, the conveyor comprising assembled first modular units in accordance with claim 7.

16. A conveyor for the transport of items, the conveyor comprising assembled first modular units in accordance with claim 8.

* * * * *